US008924006B2

(12) United States Patent
Amsden et al.

(10) Patent No.: US 8,924,006 B2
(45) Date of Patent: Dec. 30, 2014

(54) DEVICE AND METHODS FOR PICKING AND PLACING HOT 3D GLASS

(71) Applicant: Corning Incorporated, Corning, NY (US)

(72) Inventors: Jeffrey Michael Amsden, Hammondsport, NY (US); Michael J Anderson, Horseheads, NY (US); Gail Dyer, Elmira, NY (US); Scott Michael Kabel, Corning, NY (US); Stephen Kuo-Rui Liu, Corning, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 120 days.

(21) Appl. No.: 13/687,510

(22) Filed: Nov. 28, 2012

(65) Prior Publication Data

US 2013/0136565 A1    May 30, 2013

Related U.S. Application Data

(60) Provisional application No. 61/565,021, filed on Nov. 30, 2011.

(51) Int. Cl.
| G06F 7/00 | (2006.01) |
| B66C 1/02 | (2006.01) |
| C03B 35/00 | (2006.01) |
| C03B 35/14 | (2006.01) |
| B25J 15/00 | (2006.01) |
| B25J 15/06 | (2006.01) |
| B25J 17/02 | (2006.01) |
| C03B 23/035 | (2006.01) |

(52) U.S. Cl.
CPC ............. *B66C 1/0237* (2013.01); *C03B 35/005* (2013.01); *C03B 35/14* (2013.01); *C03B 35/145* (2013.01); *B25J 15/0052* (2013.01); *B25J 15/0616* (2013.01); *B25J 17/0208* (2013.01); *C03B 23/035* (2013.01); *C03B 23/0357* (2013.01); *B65G 2249/04* (2013.01); *B65G 2249/045* (2013.01)
USPC ........... 700/228; 700/229; 700/230; 700/223; 700/213

(58) Field of Classification Search
None
See application file for complete search history.

(56) References Cited

U.S. PATENT DOCUMENTS 4,615,493 A * 10/1986 Teranishi et al. .......... 242/473.7
5,143,196 A    9/1992 Henn et al.
(Continued)

FOREIGN PATENT DOCUMENTS

| KR | 2010022491 | 3/2010 |
| WO | 2007014251 | 2/2007 |
| WO | 2007089374 | 8/2007 |

OTHER PUBLICATIONS

Machine translation of KR2010022491.

(Continued)

*Primary Examiner* — Yolanda Cumbess
(74) *Attorney, Agent, or Firm* — John T. Haran

(57) ABSTRACT

A system for picking and placing glass articles from a first location to a second location, the second location including a thermal reforming apparatus for transforming the glass articles from 2D glass articles to 3D glass articles includes a robot having an end effector, the end effector including a compliance assembly having at least six degrees of freedom. The compliance assembly is in fluid communication with both an open pneumatic system and a closed pneumatic system, the open pneumatic system providing a partial vacuum to a portion of the compliance assembly for grabbing the glass article, and the closed pneumatic system for activating a centering function for a portion of the compliance assembly.

24 Claims, 13 Drawing Sheets

(56) References Cited

U.S. PATENT DOCUMENTS

| | | |
|---|---|---|
| 5,372,624 A | 12/1994 | Lesage et al. |
| 5,622,539 A | 4/1997 | Lesage et al. |
| 5,858,047 A | 1/1999 | Frank et al. |
| 7,818,863 B2 | 10/2010 | Maekawa et al. |
| 2005/0061034 A1 | 3/2005 | Boisselle et al. |
| 2007/0116550 A1* | 5/2007 | Nakamura et al. ............ 414/797 |
| 2009/0268681 A1 | 10/2009 | Lin et al. |
| 2010/0000259 A1 | 1/2010 | Ukrainczyk et al. |
| 2010/0307999 A1 | 12/2010 | Franz |
| 2011/0126588 A1 | 6/2011 | Malach et al. |

OTHER PUBLICATIONS

PCT/US2012/066965 Invitation to Pay Additional Fees.
PCT/US2012/066965 Search Report.

* cited by examiner

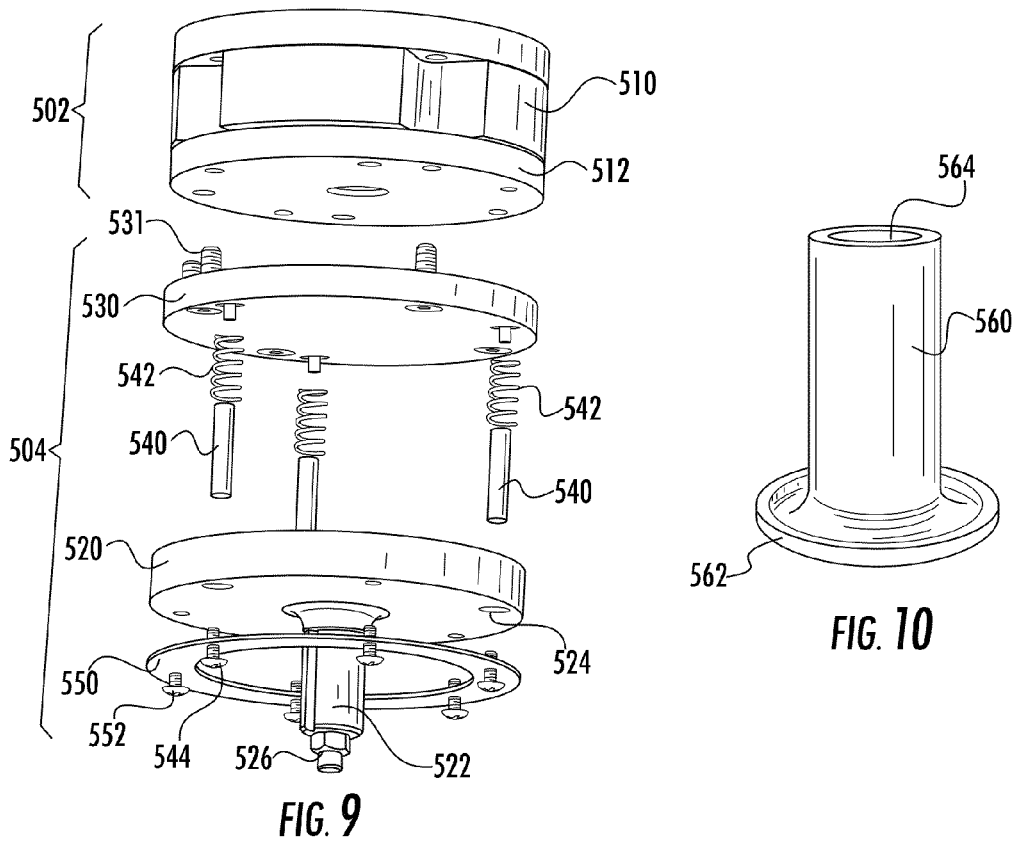
FIG. 9
FIG. 10
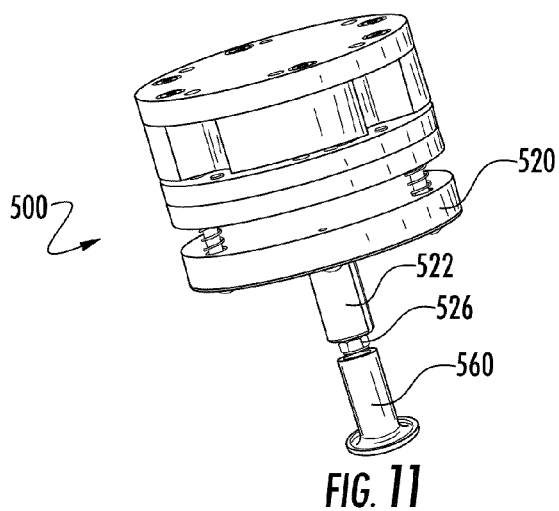
FIG. 11

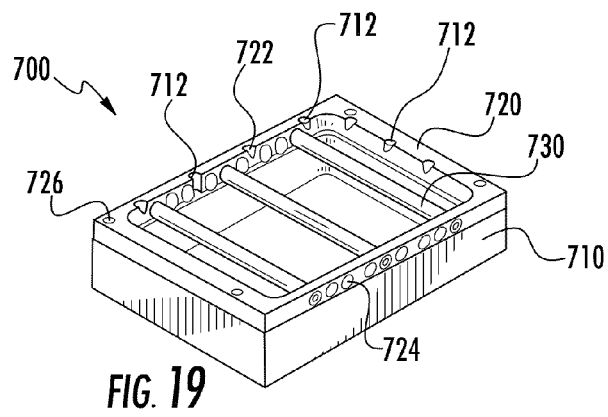
FIG. 19
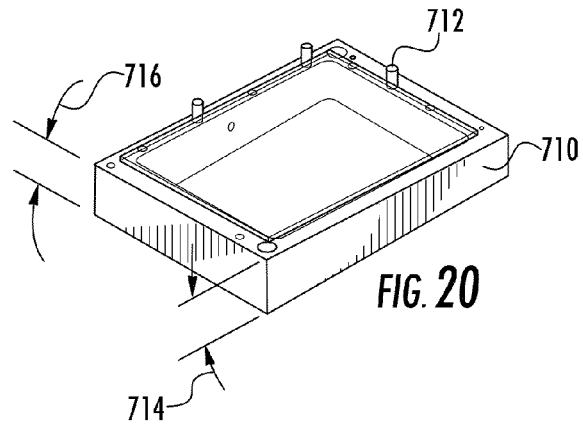
FIG. 20
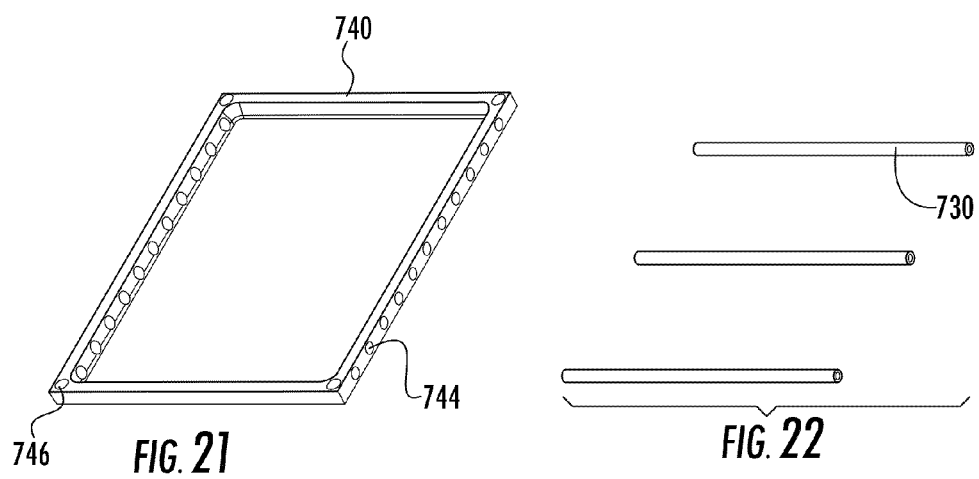
FIG. 21
FIG. 22

DEVICE AND METHODS FOR PICKING AND PLACING HOT 3D GLASS

This application claims the benefit of priority under 35 U.S.C. §119 of U.S. Provisional Application Ser. No. 61/565,021 filed on Nov. 30, 2011 the content of which is relied upon and incorporated herein by reference in its entirety.

BACKGROUND OF THE INVENTION

1. Field of the Invention

The present disclosure relates generally to manufacture of three-dimensional (3D) glass articles by thermal reforming of two-dimensional (2D) glass sheets.

2. Technical Background

There is a large demand for 3D glass covers for portable electronic devices such as laptops, tablets, and smart phones. A particularly desirable 3D glass cover has a combination of a 2D surface, for interaction with a display of a portable electronic device, and a 3D surface, for wrapping around the edge of the display. The 3D surface may be an undevelopable surface, i.e., a surface that cannot be unfolded or unrolled onto a plane without distortion, and may include any combination of bends, corners, and curves. The bends may be tight and steep. The curves may be irregular. Such 3D glass covers are complex and difficult to make with precision using machining processes such as grinding and milling. On the other hand, thermal reforming has been used to form 3D glass articles from 2D glass sheets in other types of applications. The present disclosure relates to a system, apparatus and method of picking and placing the glass articles, before thermal reforming and after thermal reforming in such manner so as not to damage the glass articles that enables use of thermal reforming to make 3D glass covers such as described above.

SUMMARY

A system for handling a glass article that is being transported to and from a thermal reforming apparatus may include at least one robot in communication with at least one compliance assembly. The compliance assembly may include at least one first portion and at least one second portion, the at least one first portion including a compliance device for accommodating a positional error between a target location and an actual location. At least a portion of the compliance device may be capable of at least three degrees of freedom. The at least one second portion may include a compliance device adapter for interfacing between the compliance device and at least one glass article, at least a portion of the compliance device adapter capable of at least three other degrees of freedom.

The system may further include at least one open pneumatic system in fluid communication with the compliance device adapter and at least one closed pneumatic system in fluid communication with the at least one first portion of the compliance assembly.

In exemplary embodiments, the system may include a manifold having at least one connecting means for connecting the manifold to the robot, at least one adapter plate for receiving the at least one compliance assembly. The manifold may also define and at least one chamber, for example, at least one vacuum chamber for buffering a vacuum from the open pneumatic system. The open pneumatic system may be in fluid communication with the at least one chamber, the open pneumatic system adapted to apply a fluid pressure that is lower than an ambient pressure through the at least one chamber, creating a partial vacuum in the at least one chamber.

In exemplary embodiments, the at least one closed pneumatic system may be adapted to apply another fluid pressure, the other fluid pressure including a positive fluid pressure greater than the ambient pressure and a negative fluid pressure less than the ambient pressure.

The system may also include at least one input nest assembly and an output nest assembly, both assemblies including at least one cross bar receiving frame, at least one cross bar for inserting into the at least one cross bar receiving frame and at least one compound angle nest frame for receiving the at least one cross bar receiving frame. In exemplary embodiments at least a portion of the input nest assembly may be made from a polymer and at least a portion of the output nest assembly may be made from a heat resistant material.

The system may further include at least one wedge adapter plate to enable picking and placing from an array of molds, and at least one compound angle adapter plate having a compound angle that corresponds to the compound angle nest frame.

It is to be understood that both the foregoing general description and the following detailed description are exemplary of the present disclosure and are intended to provide a framework for understanding the nature and character of the present disclosure as it is claimed. The accompanying drawings are included to provide a further understanding of the present disclosure and are incorporated in and constitute a part of this specification. The drawings illustrate various embodiments of the disclosure and together with the description serve to explain the principles and operation of the disclosure.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 9 is a partially exploded view of a compliance assembly;

FIG. 10 is a perspective view of a suction cup;

FIG. 11 is a perspective view of the compliance assembly of FIG. 9 having the suction cup of FIG. 10;

FIG. 19 is perspective view of a representative input/output nest assembly;

FIG. 20 is a perspective view of a compound angle nest frame for the input/output nest assembly of FIG. 19;

FIGS. 21 and 22 are perspective views of an embodiment of an input/output cross bar receiving frame and input/output crossbars for the input/output nest assembly of FIG. 19;

DETAILED DESCRIPTION

Figure 1:
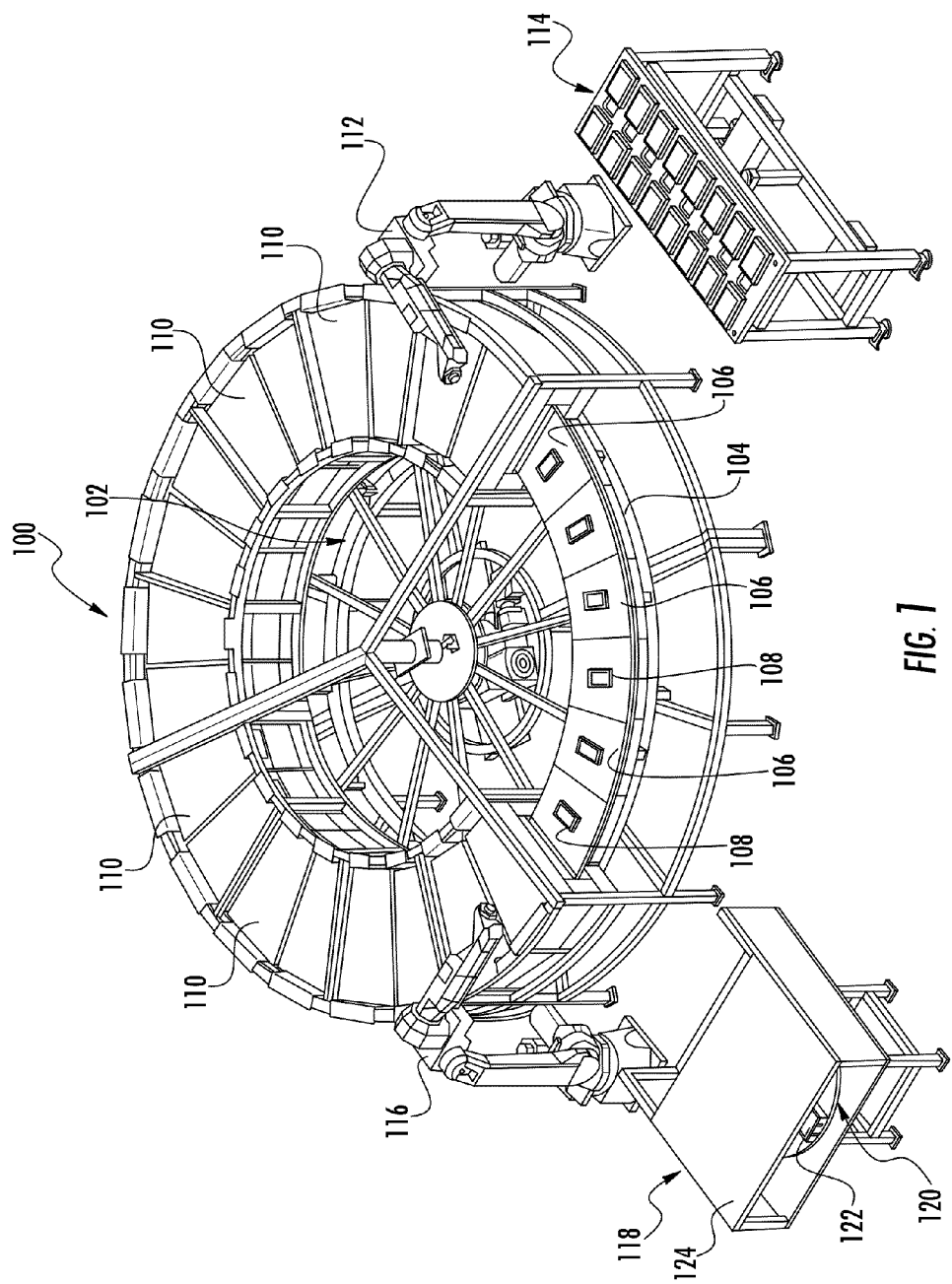
FIG. 1 is a perspective view of a continuous glass molding system.

A continuous glass molding system 100 (FIG. 1) is disclosed for producing 3D glass articles from 2D glass sheets by thermal reforming. Continuous glass molding system 100 includes a primary rotary table system 102 having a primary rotary indexing table 104. Primary rotary table system 102 can be any custom or commercial rotary table system capable of translating primary rotary indexing table 104 along a circular or looped path through a selected rotational angle. (Here and below, a non-rotary table system, such as a linear table system, with a non-rotary indexing table, such as a linear indexing table, may be used in lieu of a rotary table system with a rotary indexing table.) Several stations 106 are defined on primary rotary indexing table 104, and each station 106 includes a support for a mold 108. Heating modules 110 are arranged along primary rotary indexing table 104, and primary rotary indexing table 104 can be rotated to allow each station 106 to be selectively indexed with any one of heating modules 110. In an exemplary embodiment, station 106 being indexed with heating module 110 may have mold 108 supported at station 106 being disposed within heating module 110, allowing a 2D glass sheet supported on mold 108 to be formed into a 3D glass article in the heating module 110. Typically, the number of stations 106 will exceed the number of heating modules 110 so that only some of stations 106 may be indexed with heating modules 110 at any time. In an exemplary embodiment, there may be twenty-four stations 106 and eighteen heating modules 110 (FIG. 1), but any number of stations 106 and heating modules 110 may be contemplated in the system. Each station 106 not being indexed with heating module 110 may be open to the air to allow operator access for performing such operations as loading of a 2D glass into a mold, unloading of a 3D glass article from a mold, cleaning of a mold, and repairing or replacement of a mold.

Continuous glass molding system 100 may include an indexing period followed by a wait period, defining a cycle. During the indexing period, for example, primary rotary indexing table 104 may be rotated by some rotational angle α in some direction β (which may be clockwise or counterclockwise), which results in a particular configuration of stations 106 being indexed with heating modules 110. The rotational speed may be constant or varied during the indexing period. By way of example, such a variation may include an initial acceleration, followed by a steady speed, followed by a final deceleration. For a first cycle, it may be that only one of stations 106 being indexed with heating modules 110 would support a mold 108 carrying a 2D glass sheet. After a few more cycles, for example, all of stations 106 being indexed with heating modules 110 would each support mold 108 carrying a 2D glass sheet or mold 108 carrying a 3D glass article. Whether mold 108 is carrying a 2D glass sheet or a 3D glass article would depend on the position of mold 108 along the sequence of heating modules 110. During the wait period, thermal reforming of the 2D glass sheet into the 3D glass article may be carried out at each station 106 that is indexed with heating module 110. For continuous production, for example, it may not be feasible to complete thermal reforming in a single heating module 110, in which case thermal reforming may be distributed among a series of heating modules 110. A typical thermal reforming process may involve heating the 2D glass sheet to a forming temperature, e.g., a temperature in a temperature range corresponding to a glass viscosity of $10^7$ Poise to $10^{11}$ Poise, and then allowing the heated 2D glass sheet to sag against a mold surface to form the 3D glass article. Sagging is typically assisted by vacuum, i.e., by applying vacuum to the glass to draw the glass against the mold surface. After forming the 3D glass article, the 3D glass article is cooled to a temperature below the strain point of the glass, which would allow handling of the 3D glass article. For distributed thermal reforming, a segment of heating modules 110 could be devoted to heating the 2D glass sheet to a forming temperature, another segment of the heating modules 110 could be devoted to forming the 2D glass sheet into the 3D glass article, and another segment of the heating modules 110 could be devoted to cooling the 3D glass article.

Figure 3:
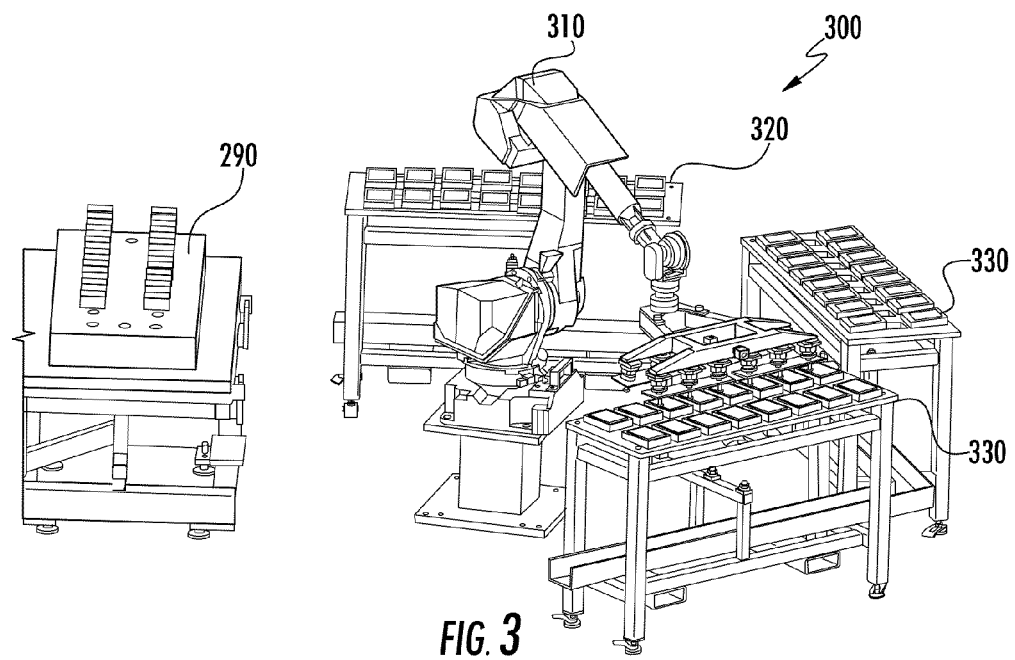
FIG. 3 is a perspective view of a system for picking and placing articles.

The cycle described above is repeated as many times as desired for continuous production of 3D glass articles from 2D glass sheets by thermal reforming. While the cycles are ongoing, additional activities may be taking place, for example, unloading 3D glass articles from molds and loading new 2D glass sheets into empty molds. As primary rotary indexing table 104 is rotated, each of stations 106 supporting mold 108 carrying a 3D glass article will eventually become exposed to the air, allowing access to the 3D glass article. In exemplary embodiments, a robot 112 may then be used to unload the 3D glass article from the mold 108 onto an unloading area 114. Also, another robot 116 may be used to load new 2D glass sheets from a loading area 118 onto the emptied mold 108. In some embodiments, a single robot 310 (see FIG. 3) may be used to both unload 3D glass articles and load 2D glass sheets. To enable a high throughput, the 2D glass sheets are preheated before being loaded onto the mold 108. For this purpose, loading area 118 may include a secondary rotary indexing system 120, which includes a secondary rotary table 122. Several stations may be defined on secondary rotary indexing table 122, as in the case of the primary rotary indexing table 104. In one embodiment, secondary rotary indexing table 122 may be disposed in a furnace 124. For example, 2D glass sheets are first loaded onto the stations of secondary rotary indexing table 122 and preheated in the furnace 124. In one embodiment, preheating includes flowing heated gas, such as nitrogen, over the 2D glass sheets. The 2D glass sheets may be heated to a preheat temperature below the forming temperature. Robot 116 may then transfer the preheated 2D glass sheets onto stations 106 of the primary rotary indexing table 104 for further heating and forming into 3D glass articles by thermal reforming. In one example, secondary rotary indexing table 122 may have six stations, but there is no particular restriction on how many stations may be defined on secondary rotary indexing table 122. Robots 116, 112 may use vacuum or suction cups to grab the 2D glass sheets and 3D glass articles, respectively. In exemplary embodiments, the vacuum or suction cups or other means of grabbing the 2D glass sheets and 3D glass articles should not scratch the glass, mar the glass, or leave residue on the glass.

A heating module 200 (FIG. 2) that could be used as any one of heating modules 110 described above may include a housing 202, which defines a heating enclosure 204. The wall of housing 202 may have a wall layer 203, for example, made of a refractory material and surrounding heating enclosure 204, a wall layer 205, for example, made of a refractory material and surrounding portions of wall layer 203, and a wall layer 207, for example, made of insulating material and surrounding wall layers 203, 205. The insulated refractory wall of housing 202 allows the temperature in heating enclosure 204 to be controllable. An upper portion 209 of heating enclosure 204 serves as a temperature-controlled space in which a 2D glass sheet is heated while on a mold and then formed into a 3D glass article. For this purpose, an array of radiant heaters 206 may be disposed in upper portion 209 of heating enclosure 204. A radiation emitter body 208 may also be disposed in upper portion 209 of heating enclosure 204, below the array of radiant heaters 206. In one embodiment, the radiation emitter body 208 may be secured to housing 202, for example, by inserting the ends of radiation emitter body 208 into grooves 211 in refractory layer 203 of housing 202.

A radiation reflector surface 210 may be disposed in heating enclosure 204, below the radiation emitter body 208. In exemplary embodiments, radiation reflector surface 210 may be an integral part of the heating module 200, e.g., radiation reflector surface 210 may be supported on a surface in heating enclosure 204 or secured to the wall of housing 202. In such embodiments, radiation reflector surface 210 would be stationary. In other embodiments, radiation reflector surface 210 may be provided by or formed on a surface of an indexing table 217, for example, corresponding to primary rotary indexing table 104 (see FIG. 1). In such embodiments, radiation reflector surface 210 may be capable of moving through heating enclosure 204 with indexing table 104. Radiation reflector surface 210 may have a receiving area, which is a designated area for receiving an object to be heated. In one embodiment, radiation reflector surface 210 may include a receiving hole 212 for receiving the object to be heated. For glass molding applications, receiving hole 212 may be sized to receive a mold on which glass is or may be supported. A lower portion 213 of heating enclosure 204 may include an opening 215 for passage of indexing table 217 through heating enclosure 204. By way of example, a station on the indexing table 217 (FIG. 2) has been indexed with heating module 200 so that a mold 214 at the station is placed in heating enclosure 204. Mold 214 may also placed in receiving hole 212 of radiation reflector surface 210, for example, which may be arranged in heating enclosure 204. The placement of mold 214 in receiving hole 212 may allow radiation reflector surface 210 to surround a periphery of mold 214. With this placement, the top of mold 214 may or may not be flush with radiation reflector surface 210. The array of radiant heaters 206 emits radiation, which may be received at a top surface 222 of radiation emitter body 208 and absorbed into radiation emitter body 208. Radiation emitter body 208 in turn emits the absorbed radiation from a radiation emitter body bottom surface 216, for example, towards radiation reflector surface 210 so that the radiation may be used to heat mold 214 (as well as the glass on the mold). In some embodiments, the array of radiant heaters 206 in combination with radiation emitter body 208 may provide a thermally uniform heat source for mold 214 (and the glass on the mold). The radiation not used in heating, for example, not absorbed by, mold 214 (and the glass on the mold) may be reflected back to radiation emitter body 208 by radiation reflector surface 210.

In some embodiments, radiation reflector surface 210 may be a flat surface. In one embodiment, radiation emitter body bottom surface 216 is flat and opposed to radiation reflector surface 210. In one embodiment, radiation reflector surface 210 and radiation emitter body bottom surface 216 may be substantially parallel to each other. Radiation reflector surface 210, in exemplary embodiments, may be a surface of a plate or may be plating on any suitable surface, such as a surface of an indexing table. In some embodiments, radiation reflector surface 210 may be made of a refractory material, e.g., a silicon carbide or other such suitable ceramic material as ZIRCAR, both commercially available. In some embodiments, radiation reflector surface 210 may have a relatively low emissivity, for example, an emissivity less than 0.4. In some embodiments, radiation emitter body 208 may be a plate. In some embodiments, radiation emitter body 208 may have a relatively high emissivity, for example, an emissivity greater than 0.8. In exemplary embodiments, suitable materials for radiation emitter body 208 and radiation reflector surface 210 should be appropriate for the high temperatures that would be encountered within heating enclosure 204. For an infinite parallel plate heat system, along with selecting the emissivity of the radiation reflector surface 210 to be low, for example, less than 0.4, the area of the radiation emitter body bottom surface 216 may be selected to be much larger than the area of receiving hole 212 in radiation reflector surface 210 or the area of the top of mold 214. In some embodiments, the area of radiation emitter body bottom surface 216 may be approximately 9 times larger than the area of receiving hole 212 or the area of the top of mold 214. The span of radiation emitter body bottom surface 216 may be greater than or approximately the same as the span of radiation reflector surface 210. In exemplary embodiments, the radiation view factor of the system may be selected to maximize the efficiency of heat transfer of the system. This may be achieved in some embodiments by locating the top of mold 214 (or radiation reflector surface 210, which includes receiving hole 212 for the mold 214) close to radiation emitter body bottom surface 216, which in exemplary embodiments may be from 10 millimeters (mm) to 50 mm from bottom surface 216.

In some embodiments, the array of radiant heaters emits radiation in the infrared range. In exemplary embodiments, the array of radiant heaters 206 emits radiation in the middle infrared range, i.e., 1.5 µm to 5.6 µm. Alternatively, the array of radiant heaters 206 may emit radiation at a wider infrared range and a suitable filter between radiant heaters 206 and radiation emitter body 208 may be used to restrict the wavelength of radiation that may be absorbed by radiation emitter body 208 to the middle infrared range. The middle infrared range is useful for preferential heating of glass on mold, as described in U.S. Patent Application Publication No. 20100000259 (Ljerka Ukrainczyk; 7 Jan. 2010). The preferential heating is such that the glass is hotter than the mold at and during the time the glass is formed into a 3D shape on the mold. Additional radiant heaters 218 may be arranged between the array of radiant heaters 206 and radiation emitter body 208 to provide additional heat to radiation emitter body 208 where needed. For example, additional heat may be needed in portions of radiation emitter body 208 near the periphery of heating enclosure 204. The additional radiant heaters 218 and the array of radiant heaters 206 may be controlled to uniformly heat radiation emitter body 208 so that radiation emitter body 208 uniformly heats mold 214 (and glass on the mold). The temperature of radiation emitter body 208 or of the space between the heaters 206, 218 and the radiation emitter body 208 may be monitored using suitable temperature sensors, and the output of the sensors may be used to control the output of radiant heaters 206, 218. The ends of radiant heaters 206, 208 protrude through the wall of housing 202 and may be encased, for example, in perforated end plates 220 mounted on the exterior of housing 202. These ends may include electrical connectors for connecting radiant heaters 206, 218 to an electrical source. To protect these electrical connectors, the perforations in perforated end plates 220 may be used to circulate cooling air around the electrical connectors.

Figure 2:
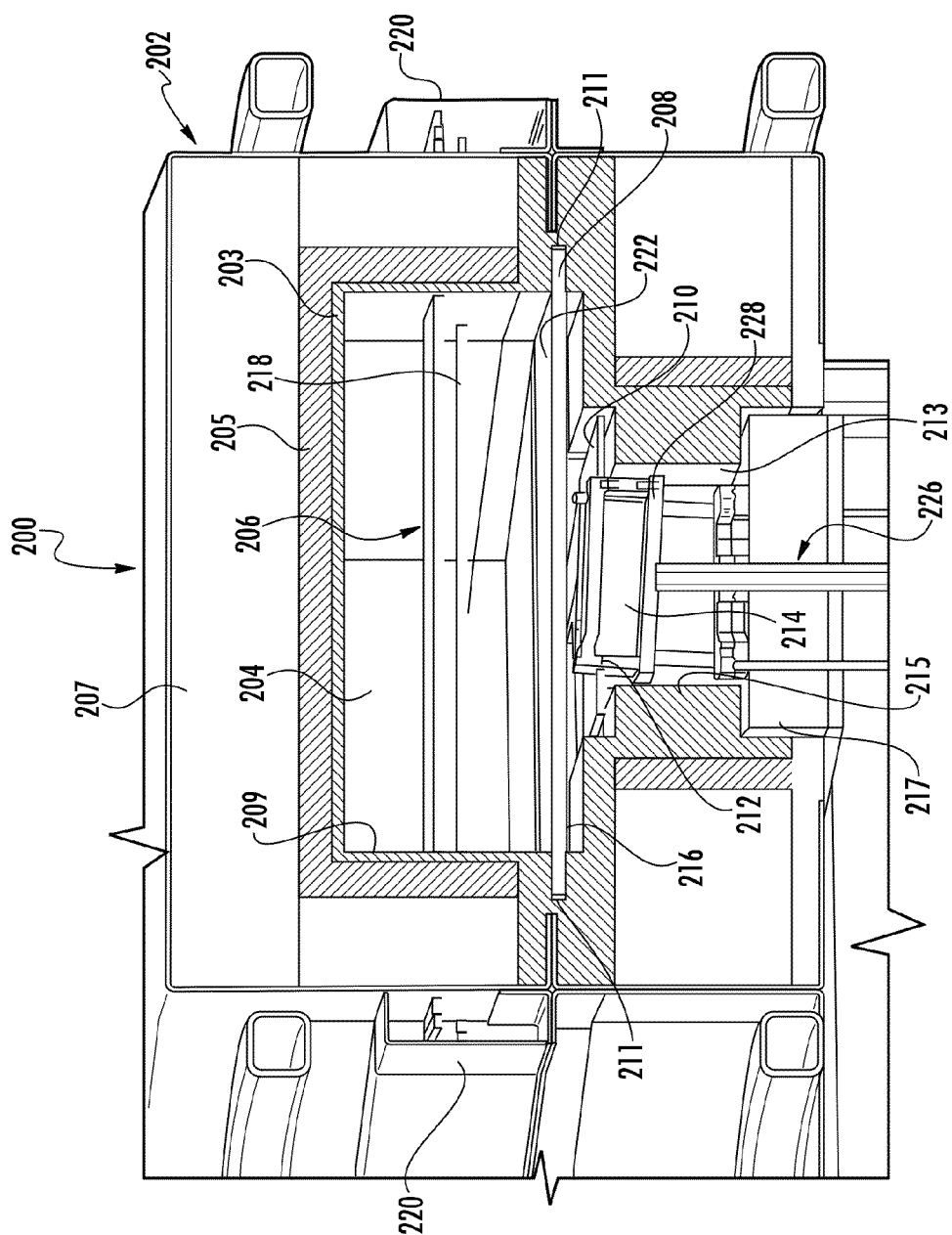
FIG. 2 is a cross-section of a heating module.

By way of example, a mold assembly 226 is shown at the opening 215 (FIG. 2). Mold assembly 226 may be supported, for example, at a station that is part of the indexing table 217, where the station has been placed in the opening 215, for example, through rotation or other movement of indexing table 217 through the heating enclosure 204. Mold assembly 226 may include mold 214 mentioned above and a support 228 for mold 214. In exemplary embodiments, mold support 228 may incorporate a tilting stage for tilting mold 214 while mold 214 is received in receiving hole 212 (or receiving area) of radiation reflector surface 210 to assist alignment of the glass on mold 214. A suitable positioning system attaches mold support 228 to indexing table 217 so that mold assembly 226 may travel with indexing table 217. Mold assembly 226 may further include a conduit (or conduits), for example, for applying vacuum to mold 214 and a conduit (or conduits) for applying gas around mold 214. The gas applied around mold 214 may be for cooling the 3D glass article on mold 214 after the 3D glass article has been formed. The details of an exemplary mold 214 are described in U.S. Patent Application Publication No. 20110126588 (Joseph D. Malach; 2 Jun. 2011). In exemplary embodiments, mold 214 may have a mold surface having a 3D profile that corresponds to the 3D shape of the glass article to be formed using mold 214. Mold 214 may also have ports through which vacuum can be applied to the glass to draw the glass against the mold surface. The ports may open to the mold surface and be in communication with the conduit(s) for applying vacuum to the mold 214.

In some embodiments, the handling of the glass article being transported to and from the thermal reforming apparatus may include robots 112, 116 (FIG. 1). In some embodiments, a system 300 (FIG. 3) for handling the glass article being transported to and from a thermal reforming apparatus, for example, continuous glass molding system 100 or pivoting mold table 290, may include at least one robot assembly 310 adapted to transport the glass articles from a first location, for example, an input table 330, to a second location, for example, continuous glass molding system 100 or pivoting mold table 290. For clarity, the disclosure will discuss glass articles being transported from input table 330 to pivoting mold table 290, though the disclosed system 300 may be applied to continuous glass molding system 100. Further, the glass articles may be transported by robot assembly 310 from, for example, pivoting mold table 290 to a third location, for example, at least one output table 320.

Figure 4:
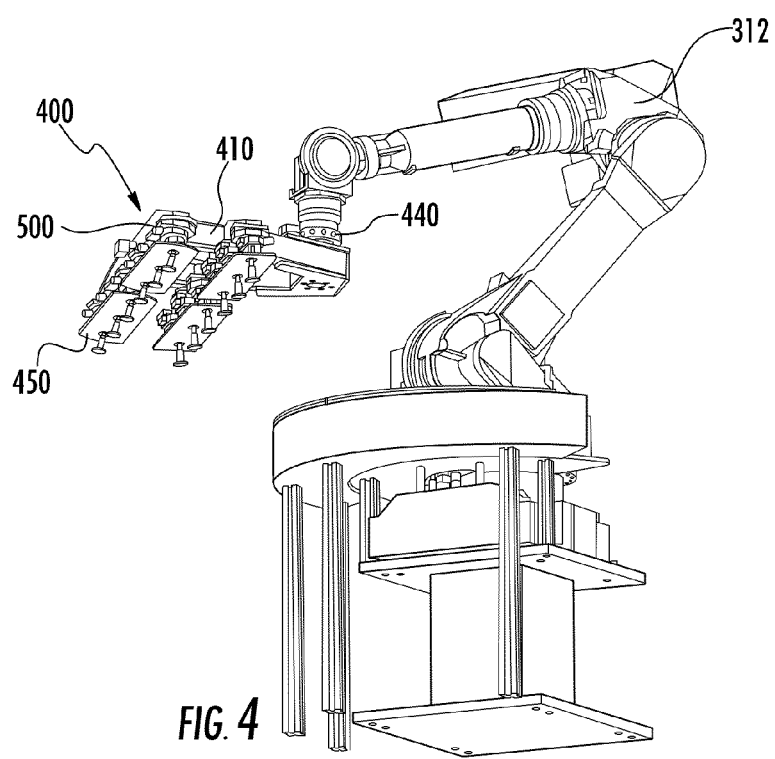
FIG. 4 is a bottom perspective view of a robot assembly from the system of FIG. 3.

An exemplary robot assembly 310 may include, for example, a manipulating industrial robot 312 having a robotic arm suitable for attaching a robot end effector assembly 400. End effector assembly 400 may be attached to robot 312, for example, by means of such a coupling collar 440 as, for example, commercially available from Schunk GmbH & Co. KG (FIG. 4). Any suitable robot and coupling means may be used. End effector assembly 400 may include at least one compliance assembly 500. In some embodiments, for example, those applications for picking and placing a single glass article at a time, compliance assembly 500 may be directly connected to, for example, robots 112, 116, and 312 and may serve as the end effector for the respective robots. In exemplary embodiments where an array of glass articles are to be picked and placed, for example, as a group, end effector assembly 400 would include, for example, a manifold 410 capable of holding an array of compliance assemblies 500.

Figure 5:
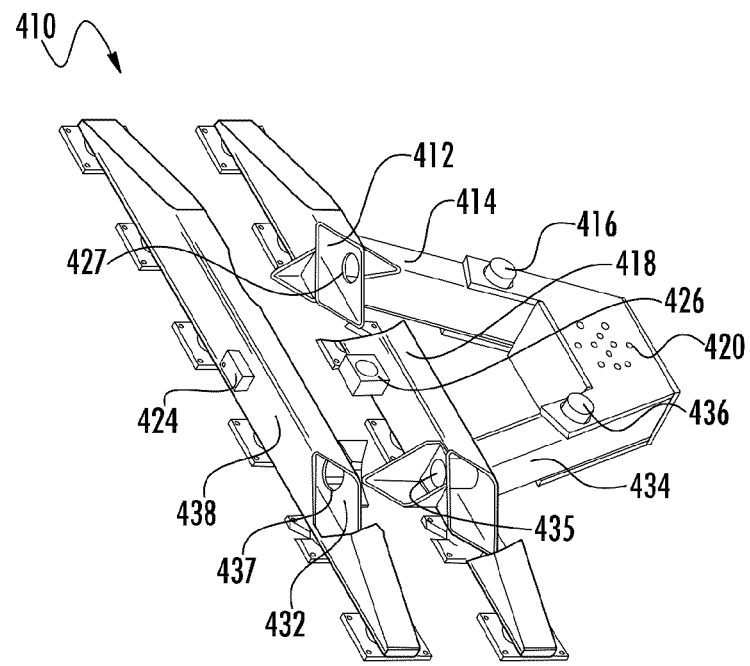
FIG. 5 is a perspective partial cut-away view of a manifold.
Figure 6:
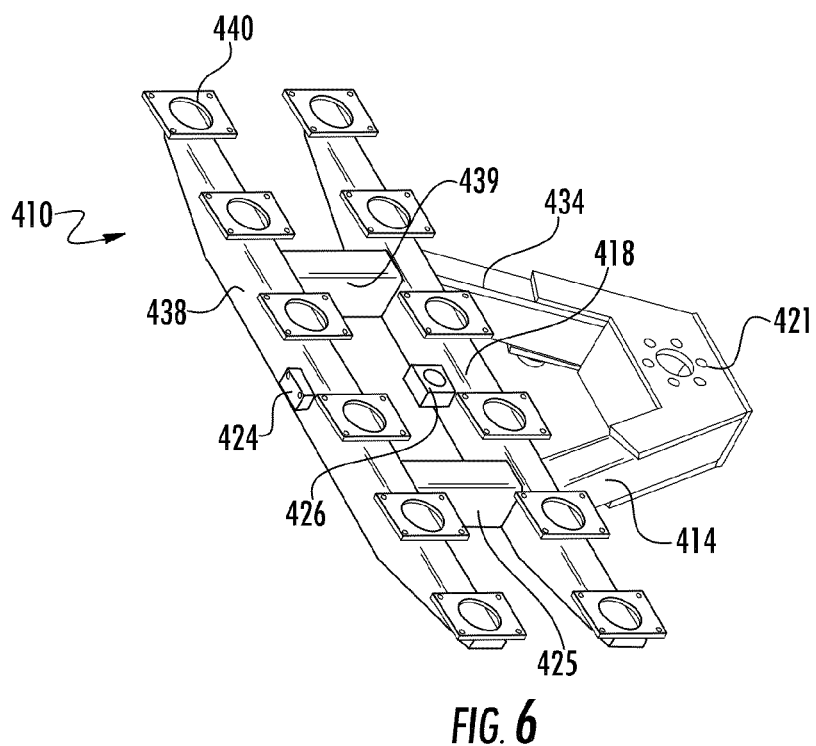
FIG. 6 is a perspective view of the bottom of the manifold of FIG. 5.

In exemplary embodiments, manifold 410 (FIGS. 5 and 6) may provide a cantilevered frame for holding an array of compliance assemblies 500. Collar 440 may attach to manifold 410 by collar interface 420. Manifold 410, in exemplary embodiments, may be made from a rigid material, for example, a stainless steel tubing material that has such desirable properties as heat resistance and low mass. Manifold 410 may be a vacuum buffer chamber having a rear chamber 412 and a front chamber 432. In exemplary embodiments, rear 412 and front 432 chambers may be in fluid communication with, for example, an open pneumatic system. The open pneumatic system, e.g., a vacuum system, may be adapted to apply a fluid pressure to manifold 410 that is lower than an ambient pressure (nominal atmospheric pressure) through rear 412 and front 432 chambers, for example, creating a partial vacuum in rear 412 and front 432 chambers. The partial vacuum may traverse from at least one input port (not shown), through at least one of chambers 412, 432, through one of a rear 414 and a front 434 transition chamber to one of a rear 416 and a front 436 output port. Each of output port 416, 436 may be attached to, for example, a vacuum hose or other such means of transferring a partial vacuum as part of the open pneumatic system. Manifold 410 may provide a buffered, steady supply of low fluid pressure that may not be subject to, for example, fluctuations in the performance of the open pneumatic system. Put another way, the supply of low fluid pressure at the input port may be definitively on or off, rather than being partially on or partially off.

Rear chamber 412 may be in fluid communication with rear transition chamber 414 by way of a rear transition port 427 for allowing the fluid pressure to pass freely from rear chamber 412 to rear transition chamber 414. Front chamber 432 may be in fluid communication with front transition chamber 434 by way of front transition port 437. In exemplary embodiments, chambers 412, 432 are offset from each other, requiring a structure 429, 439 to support and join the two chambers 412, 432. In an exemplary embodiment, structure 439 may also define a conduit that is in fluid communication with front chamber 432 and transition chamber 434. Structures 429 may be a segregated chamber not in fluid communication with any other part of manifold 410.

Figure 12:
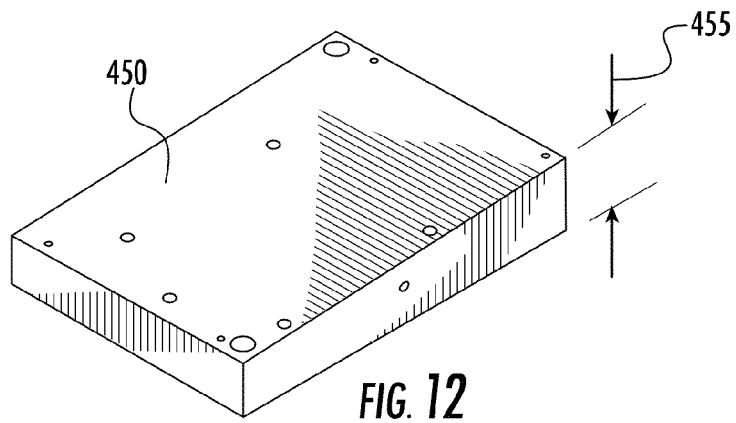
FIG. 12 is a perspective view of a wedge adapter plate.
Figure 14:
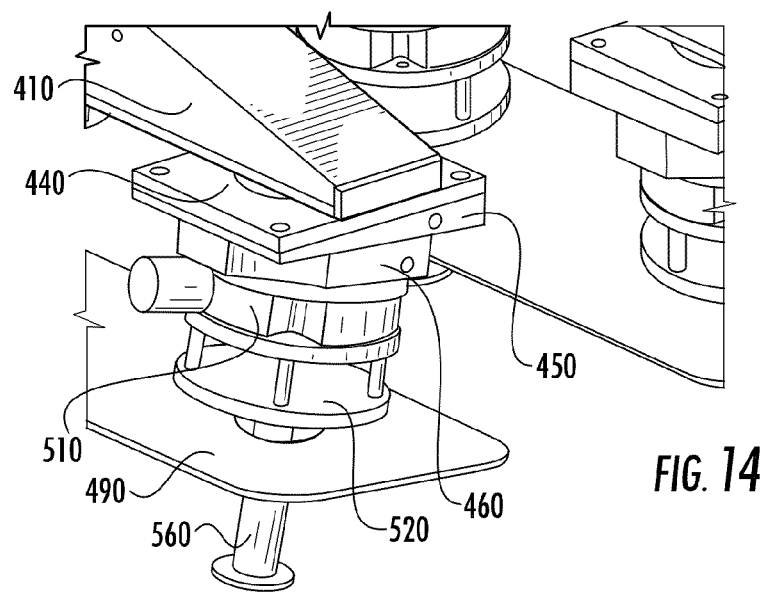
FIG. 14 is a close-up perspective view of a portion of the end effector of FIG. 7 showing the adapter plates of FIGS. 12 and 13.

End effector assembly 400 may receive compliance adapter assemblies 500 directly onto adapter plates 440. In some exemplary embodiments, manifold adapter plates 440 may receive at least one wedge adapter plate 450 (see FIGS. 12 and 14) having two generally opposing surfaces, for example, at an angle 455 to each other in a single axis. Wedge adapter plate 450 may be aligned so that the axis of angle 455 is oriented from front to rear relative to manifold 410, but other arrangements may be contemplated. In some exemplary embodiments, wedge adapter plates 450 located on the front and the rear of manifold 410 may be aligned so that angles 455 open toward an area between the front and rear of manifold 410, toward each other, causing the angled faces to point away from each other.

Figure 13:
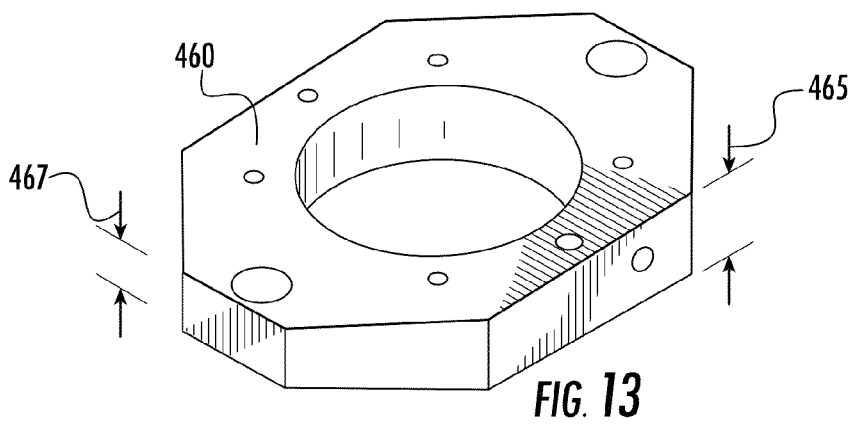
FIG. 13 is a perspective view of a compound angle adapter plate.

In some exemplary embodiments, compound angle adapter plate 460 (see FIGS. 13 and 14) may be joined to wedge adapter plate 450. In exemplary embodiments, compliance adapter assemblies 500 may be associated with at least one compound adapter plate 460. Compound adapter plate 460 may include generally opposing surfaces that have two different angles between them, each angle in a different axis, for example, to correspond to angles that may be found on various article placement locations, as will be discussed. By way of example, one surface may be a reference surface and another surface generally opposed to the one surface may be a compound surface being at angles to the reference surface in at least two axes. In some embodiments, a first angle 465, for example, in the X-axis, may be larger than a second angle 467, for example, in the Y-axis. In one embodiment, first angle 465 may be from about 2 degrees to about 5 degrees and second angle 467 may be from greater than 0 degrees to about 3 degrees. In another embodiment, first angle 465 may be about 3 degrees and second angle 467 may be about 1 degree. In exemplary embodiments, angle 455 of wedge adapter plate 450 may be the same as angle 465.

Figure 15:
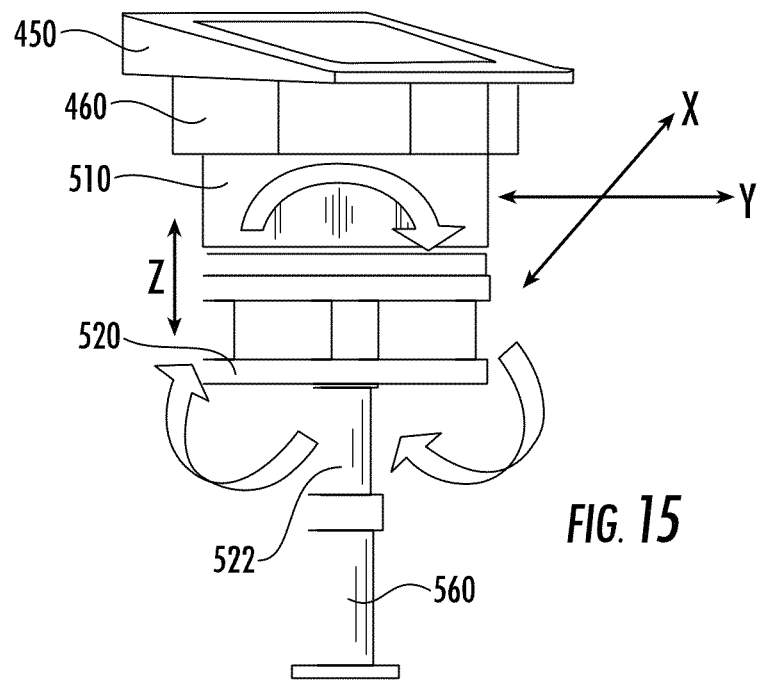
FIG. 15 is a representation of degrees of freedom of the compliance assembly of FIG. 11.

Compliance assembly 500 (FIGS. 9-11) may include, for example, at least one first portion 502 and at least one second portion 504. In exemplary embodiments, first portion 502 may define a compliance device 502 for accommodating a positional error between a target location and an actual location. The compliance device may include at least one pressure body 510 associated with, for example, a compliance plate 512 that may be capable of at least three degrees of freedom relative to pressure body 510. In exemplary embodiments, the three degrees of freedom (see FIG. 15) may include freedom to translate along an X-axis and along a Y-axis, and to translate along combinations of the X and Y-axes, and freedom to rotate about a Z-axis at any lateral location. Compliance plate 512 may also be capable of receiving second portion 504, for example, and transferring the three degrees of freedom to second portion 504. Pressure body 510 may be suitable for attaching to one of compound adapter plate 460, wedge adapter plate 450 and manifold adapter plate 440.

Second portion 504 may define at least one compliance device adapter 504 for interfacing between compliance plate 512 and at least one glass article. The compliance device adapter may include at least one mounting plate 530 for mounting to compliance plate 512, at least one vacuum body 520 in communication with mounting plate 530 and at least one suction cup being associated with the at least one vacuum body, at least one Z-axis standoff 540 associated with mounting plate 530, at least one compression spring 542 about Z-axis standoff 540, and at least one shim spring 550 associated with both Z-axis standoff 540 and vacuum body 520. In exemplary embodiments, at least a portion of compliance device adapter 504 may be capable of at least three other degrees of freedom; for example, vacuum body 520 may have three other degrees of freedom relative to mounting plate 530. The three other degrees of freedom may include, for example, Z-axis translation, pitching about an X-axis and rolling about a Y-axis (see FIG. 15).

Z-axis standoff 540, in exemplary embodiments, may stand between mounting plate 530 and vacuum body 520. Z-axis standoff 540 furthermore may connect to mounting plate 530 and to shim spring 550, for example, by a fastener 544. Z-axis standoff 540 may be disposed within bore 524 of vacuum body 520. Bore 524 may have a larger inner width than an outer width of Z-axis standoff 540, resulting in a loose fit between bore 524 and Z-axis standoff 540. In exemplary embodiments, the loose fit of Z-axis standoff 540 to bore 524 may permit motion, for example, lateral or pivotal, of Z-axis standoff 540 within bore 524. In exemplary embodiments, shim spring 550 may be secured to vacuum body 520 by fasteners 552, for example, so that shim spring 550 is held fast to vacuum body 520 at fastener 552 locations. Z-axis standoff 540, being disposed through bore 524, may be attached to shim spring 550 a radial distance from fasteners 552 such that shim spring 550 may flex and twist at Z-axis standoff 540 attachment points, enabling motion, for example, Z-axis translation, pitching and rolling, and of Z-axis standoff 540 relative to vacuum body 520. In exemplary embodiments, a plurality of Z-axis standoffs, for example, three, may be used to generally hold vacuum body 520 a nominal distance from mounting plate 530. Compression springs 542 disposed about Z-axis standoffs 540, when not being acted upon by any outside influence, may generally keep vacuum body 520 the nominal distance from mounting plate 530, but provide additional support for Z-axis translation, pitching and rolling.

Figure 7:
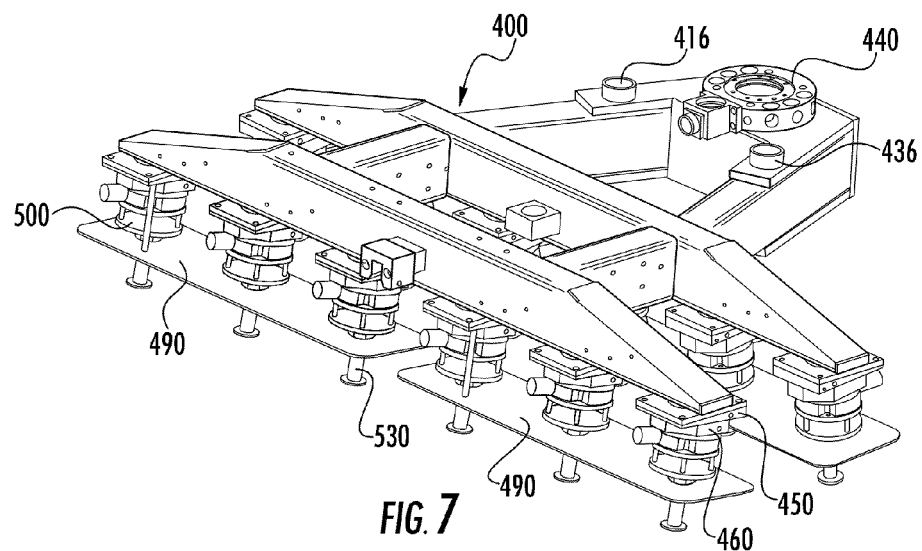
FIG. 7 is a top perspective view of a robot end effector for picking and placing.

Compliance device 510 may be in fluid communication with a closed pneumatic system (FIG. 7), for example, pressurized air or gas, for activating compliance device 510. Compliance device 510 may be any such suitable, commercially available compliance device as, for example, from RAD—Robotics & Automation Tooling, Tipp City, Ohio, USA. The closed pneumatic system may include a pressure source, for example, a pump, that may include a pressure hose assembly 470 in communication with compliance device 510. The closed pneumatic system may be adapted to provide a positive fluid pressure greater than ambient pressure and a negative fluid pressure less than ambient pressure, e.g, pulling a partial vacuum, for activating the three degrees of freedom of compliance device 510. The three degrees of freedom, in exemplary embodiments, occur when the compliance device 510 is in a depressurized state. Compliance device 510 may have zero degrees of freedom when the pressure body is in a pressurized state. Put another way, under pressure compliance device 510 "locks" or centers compliance adapter plate 512 to a home position, and under a partial vacuum compliance adapter plate 512 may be free to move in the three degrees of freedom.

Figure 8:
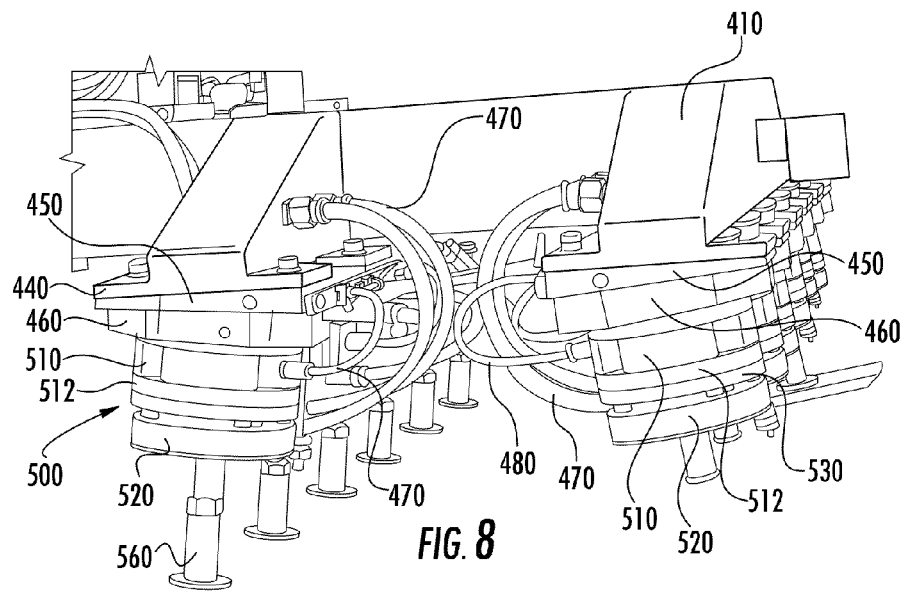
FIG. 8 is a side view of a portion of the robot end effector of FIG. 7.

In exemplary embodiments, vacuum body 520 defines a mounting portion, for example, a flange for attaching to compliance adapter 530, and a fitting extension 522 extending orthogonally from the flange. Fitting extension 522 may be adapted to receive a suction cup fitting 526, which in turn may receive a suction cup 560 at an opening 564. Suction cup 560, in exemplary embodiments, may actually contact the glass article for picking and placing onto, for example, mold 214. Vacuum body 520 may include a vacuum passage extending through, for example, the mounting portion and fitting extension 522, the vacuum passage being in fluid communication with the suction cup at fitting extension 522 and at least one hose assembly 470 (FIG. 8) at a periphery of the mounting portion.

Furthermore, hose assembly 470 may be in fluid communication with manifold 410 for providing the partial vacuum to vacuum body 520. Hose assembly 470 may be made from a heat resistant and pliable elastomer, and in exemplary embodiments may not affect the degrees of freedom of compliance assembly 500. Put another way, hose assembly 470 may move freely along with any movement of any portion of compliance assembly 500 without impeding such movement. To assist in shielding heat from mold pivot table 290 or continuous glass molding system 100, heat shields 490 may be applied substantially below the majority of compliance assembly 500 and manifold 410 (FIGS. 7 and 14), with apertures therein to allow suction cups 560 access for picking and placing. The apertures may be large enough to permit any movement of any portion of compliance assembly 500 and still provide heat resistance from the high temperatures of mold pivot table 290 or continuous glass molding system 100, and may be made from highly polished metal, for example, stainless steel.

System 300 may further include input and output nests suitable for receiving, in turn, glass articles before thermal reforming and after thermal reforming (FIGS. 19-21). Input and output nests may be located on, for example, input table 330 and output table 320, respectively (see FIG. 3). In exemplary embodiments, nests 700 may be structurally identical, being made from different materials. Input nest 700 may include a metallic frame 710, for example, made from an aluminum or steel, having a surface for receiving at least one input receiving frame 720 having at least one input cross bar 730. Input receiving frame 720 and input cross bar 730 may be made from a polymer having a hardness less than that of the glass article so as to not scratch or otherwise damage the glass article. In exemplary embodiments, input receiving frame 720 and input cross bar 730 may be made, for example, from Ultra High Molecular Weight Polyethylene (UHMW).

In exemplary embodiments, output receiving frame 720 and output cross bar 730 may be made from a soft yet heat resistant material so as not to thermally shock the hot glass articles being placed thereon directly from the hot mold pivot table 290, for example. Output receiving frame 720 and output cross bars 730 may be made, for example, from graphite. Metallic frame 710 may have a bottom for attaching to tables 320, 330, and a top generally opposite the bottom having the same compound angle as compound angle adapter plate 460. At least one reference pin 712 may extend orthogonally from the top surface and may protrude through reference pin apertures 722 located around receiving frame 720, generally extending above the top surface of receiving frame 720. Cross bars 730, generally cylindrically shaped, extend through cross bar apertures 724 located generally on the sides of receiving frame 720. Nests 700 generally include a large amount of open space to allow any broken glass articles to fall through with assistance from a downward vertical laminar airflow, keeping the surfaces clean and free from debris for protecting the glass articles.

Figure 17:
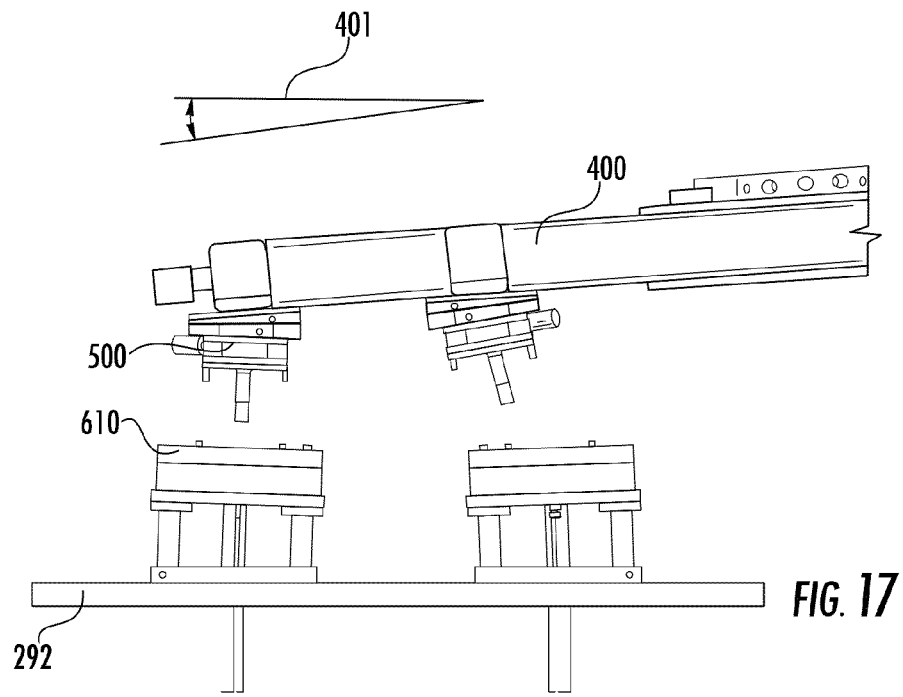
FIGS. 17 and 18 are side views of the end effector in positions for placing and picking an article on a mold.
Figure 18:
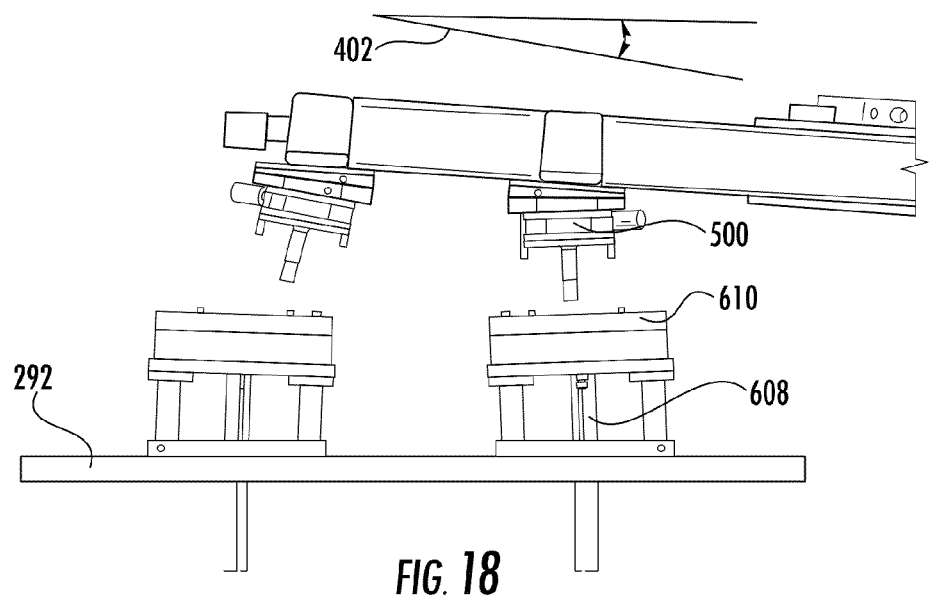
Figure 23:
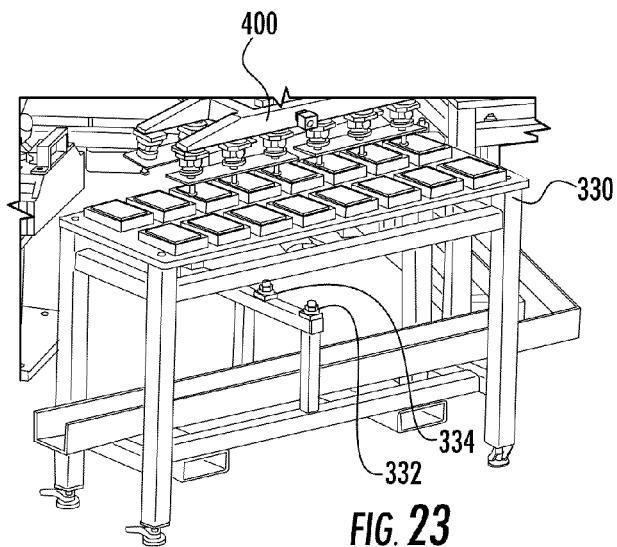
FIGS. 23 and 24 are partial close up views of the system of FIG. 3 showing a docking area for the end effector of FIG. 7.
Figure 24:
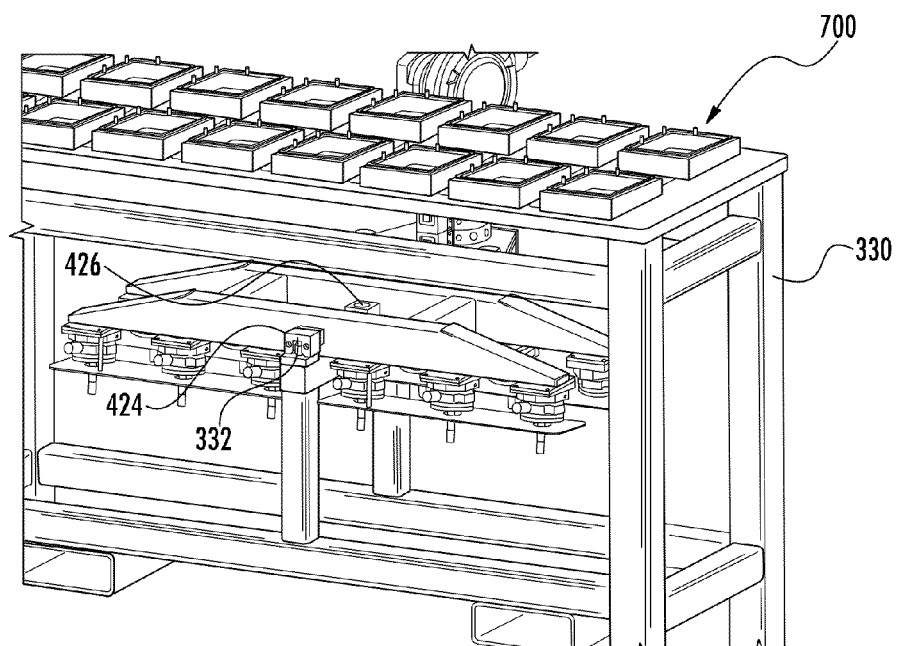

System 300 may cooperate with continuous glass molding system 100 or pivoting mold table 290 in a method of picking and placing an article, for example, at least one glass article being at least one member of the group consisting of a glass plate, a glass preform and a 3-dimensionally shaped glass article, and combinations thereof. In exemplary embodiments, robot 312 may position end effector 400 over input table 330 such that suction cup 560 may be positioned generally over a centroidal region of the glass article. In some embodiments, robot 116 may position compliance assembly 500 over the centroidal region of the glass article. The compound angles of input nests 700 may be generally matched by the compound angle of compound adapter plate 460. Input and output nests 700, as well as, for example, mold 214, may use the compound angles to encourage the glass articles to nestle against the respective reference pins, which may be located on the "low" sides of the respective compound angles, keeping the glass articles in generally the same location on nests 700 and mold 214. The position of suction cup 560 over the input glass article may be from 1 to 5 millimeters above the glass article surface. Once in position the vacuum may be activated, causing the glass article to attach to a mouth region 562. In exemplary embodiments, end effector 400 may pick at array of glass articles, for example, up to 6 in a front row and up to 6 in a back row. Wedge adapter plate 450 may enable the picking and placing of the front array and the back array independently (see FIGS. 17 and 18). Robot 312 may tilt end effector 400 at angle 401 to accommodate the shape of wedge adapter plate 450, bringing the at least one compliance assembly 500, located on front of manifold 410, into general normal alignment with, for example, a mold 610 located on at mold table 292 (FIG. 17), keeping the rear array of compliance assemblies 500 above and clear of the rear array of molds. In the case of molds 610 located on mold pivot table 290, the compound angles may be arranged to cause molds 610 to be angled toward one another. After picking the first array of glass articles end effector 400 may be readjusted to another angle, for example, angle 402, bringing the at least one compliance assembly 500, located on the rear of manifold 410, into generally normal alignment with another mold 610, lifting the front array of compliance assemblies 500 clear of the other array of molds.

In some embodiments, robot 312 may move end effector 400 having picked the glass articles from input table 330 into position over mold pivot table 290. In other embodiments, robot 116 may move compliance assembly 500 having picked a glass article from loading area 118. End effector 400 may move in a single axis for locating the at least one article to a preheating location proximate to the second location, for example, mold 214 or mold 610. The preheating location may be substantially above molds 214, 610.

Preheating the at least one glass article, in exemplary embodiments, may raise the temperature of the glass article to a temperature closer to the mold temperature to reduce the chance for thermal shock to the glass article when the article is placed on mold 214. The glass article may be suspended proximal, for example, about 15 millimeters above mold 214, and held in the path of at least one stream of heated gas. The gas, for example, nitrogen (N2), may be heated by travelling through hot mold 214, for example, through at least one aperture, where the gas is heated and allowing the at least one stream of heated gas to flow across at least a portion of the at least one glass article.

Figure 25:
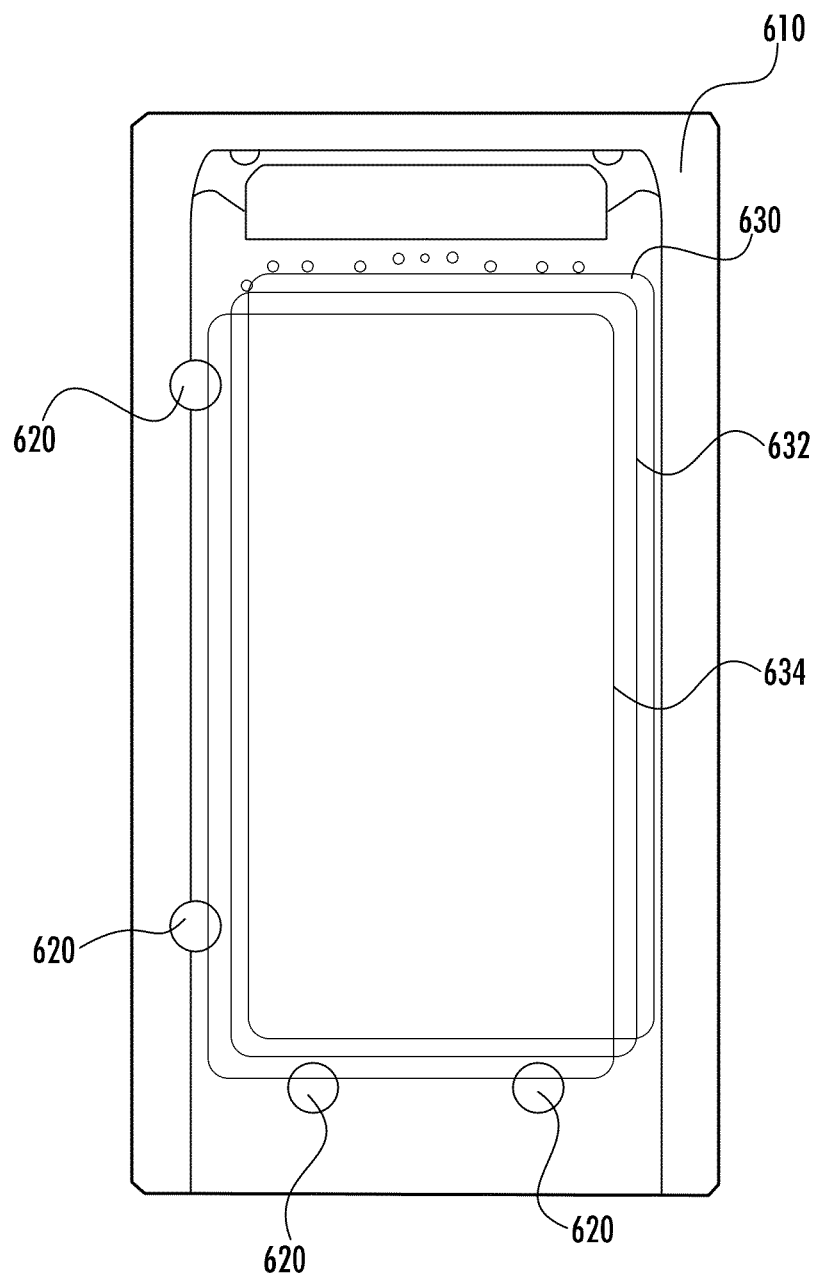
FIG. 25 is a representation of a series of locations for the article being placed on the mold.

The offset positions may be defined by relative coordinates {X, Y, Z} in millimeters (mm) with reference to, for example, the receiving surface of mold 610 and reference pins 620 (see FIG. 25) extending from the receiving surface, as related to corresponding edges of the glass articles and the bottom surface of the glass articles. In exemplary embodiments, location 630 may define two locations that share X-axis and Y-axis coordinates: the preheating location {2.5, 2.5, 15}, and a pre-placement location {2.5, 2.5, 2}. Robot 312 may move end effector 400 at a pre-placement velocity, for example, about 200 millimeters per second (mm/s) to move the glass article downward from the preheating location 630 to pre-placement location 630. Pre-placement location 630 may define a first article offset distance in the X-axis of about 2.5 mm and a second article offset distance in the Y-axis of about 2.5 mm, both from the at least one reference pin 620, and further define a third article offset distance in the Z-axis of about 2 mm from the receiving surface of mold 610.

Robot 312 may move end effector 400 laterally to position 632, for example, in a diagonal motion to reassign the X and Y coordinates, defining a base placement location 632 having relative coordinates {1, 1, 2}. This lateral, diagonal motion may be at another velocity, for example, about 50 mm/s, with the heated gas continuing to flow around the glass article.

Figure 16:
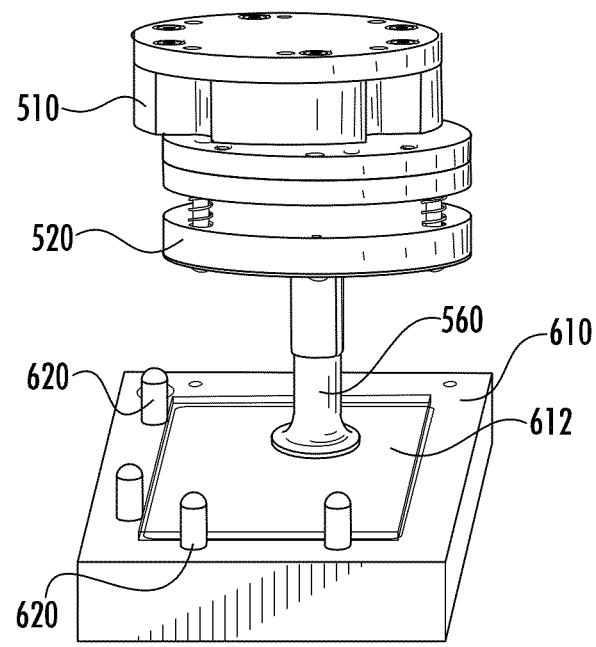
FIG. 16 is a perspective view of the compliance assembly of FIG. 11 loading an article onto a mold.

Robot 312 may move in all three axes at a third velocity, for example, 30 mm/s, to a final location prior to placing the glass article, location 634. Location 634 may define an overdrive location 634. The glass article may have relative coordinates {0, 0, 0.5} at location 634, e.g., the glass article may be touching reference pins 620 on at least two edges of the glass article, leaving the glass article suspended above the receiving surface of mold 610 at a fourth offset distance in the Z-axis of about 0.5 mm. The combination of the three degrees of freedom and the three other degrees of freedom provide for 6 degrees of freedom for suction cup 560, for example, relative to manifold 410 (see FIG. 16). At the point when the glass article contacts the reference pins 620 in the X and Y axes, the end effector 400 continues its movement for an additional distance in X and Y, ending at the overdrive location 634, for example, {−1, −1, 0.5}. When one of the glass articles makes contact with the reference pins 620, compliance assembly 500, having 6 degrees of freedom, allows end effector 400 to continue the movement while not damaging the glass article. This provides for differences in the relative location of the array of molds 610 due to thermal expansion, and insuring that all of the glass articles in the arrays are placed correctly, while not damaging any of the glass articles. Put another way, the step of moving end effector 400 in at least three axes simultaneously may include moving end effector 400 in the X-axis, the Y-axis and the Z-axis simultaneously, end effector 400 moving toward the at least one locating reference feature, for example, reference pins 620, by an amount greater than the first offset distance in the X-axis and an amount greater than the second offset distance in the Y-axis, and an amount less than the third offset distance in the Z-axis.

By shutting off the vacuum supply, the glass articles are allowed to freely descend along the fourth offset distance, placing the glass article along side the receiving surface with a gap between the glass article and the receiving surface, the gap defining a bearing layer of the heated gas. The bearing layer of heated gas may control a thermal gradient as observed by thermal imagery as the glass article heats to an operable thermal reforming temperature (see FIGS. 26A-28C), which will be discuss later in the disclosure.

After thermal reforming has been completed, as discussed previously, the hot 3D glass articles may be picked from mold 610 and placed on output table 320. The heated gas may be reinitiated, causing the hot 3D glass articles to "jump" and separate from the mold profile surface, and begin to cool. Compliance device 510 may be locked during the pick up operation by reapplying the positive pressure. End effector 400 may be repositioned above the hot 3d glass articles by moving end effector 400 toward the 3D glass article in the Z-axis so compliance assembly 500, for example, may be vertically offset from the glass article by a fifth offset distance, for example, about 2 mm. By reapplying the at least one fluid pressure, for example, the vacuum, to vacuum body 520, the glass articles, already substantially floating on anther bearing layer of heated gas, may ascend the fifth offset distance, effectively leaping to meet mouth portion 562 of suction cup 560, thereby picking the hot 3D glass articles from the second location. Robot 312 may then move end effector 400 toward a third location, for example, output table 320, placing the glass article at the third location, for example, positioning the glass articles slightly above, for example, at a output nests 700 and releasing the glass articles to drop to output receiving frame 720, 740.

Figure 26A:
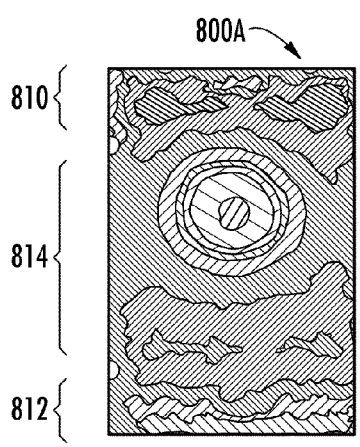
FIGS. 26A, 27A and 28A are representative drawings of articles being heated without benefit of a controlled thermal gradient.
Figure 26B:
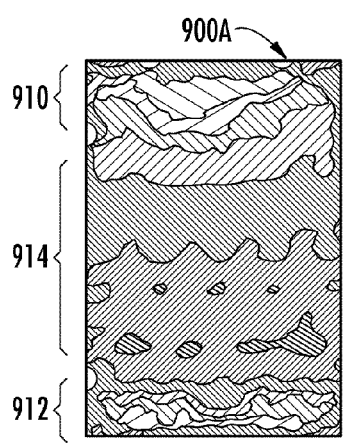
FIGS. 26B, 27B and 28B are corresponding representative drawings of articles being heated with benefit of a controlled thermal gradient.
Figure 26C:
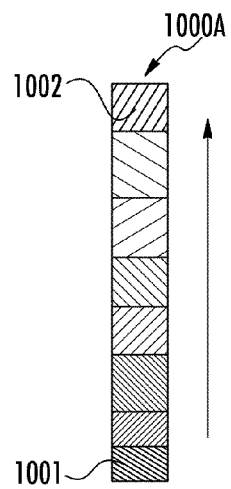
FIGS. 26C, 27C and 28C are relative heat scales corresponding to FIGS. 26A, 27A and 28A and FIGS. 26B, 27B and 28B showing increasing temperatures in the direction of the arrows.

A method of controlling the observable thermal gradient across the glass article includes, for example, limiting physical contact with the receiving surface, for example, floating the glass article on the heated gas bearing layer, causing the glass article to heat from the outside inward rather than from the inside outward. Heating from the inside outward may cause an unacceptable rate of thermal shock to the glass articles, damaging or destroying the glass articles. Thermal images 800A, 800B and 800C represent a glass article heating on a hot mold without benefit of a bearing layer of heated gas, and thermal images 900A, 900B, and 900C represent another glass article heating on a hot mold with benefit of a bearing layer of heated gas. For example, regarding thermal image 800A, perimeter regions 810, 812 are generally cooler than middle region 814 (FIG. 26A) as evidenced by scale 1000A (FIG. 26C). Hottest region 1002 may be seen in middle region 814, while coolest region 1001 may be seen in perimeter regions 810, 812. Image 900A (FIG. 26B) represents heating of the glass article having benefit of the bearing layer of gas, hottest region 1002 may be seen in perimeter region 912, with perimeter region 910 being hotter than middle region 914.

Figure 27A:
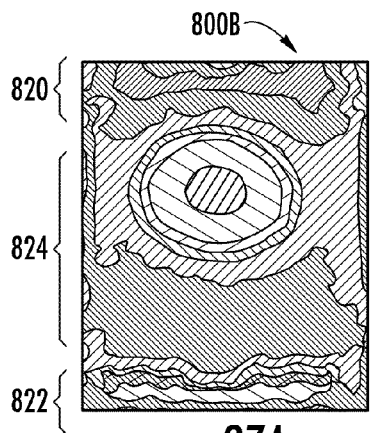
Figure 27B:
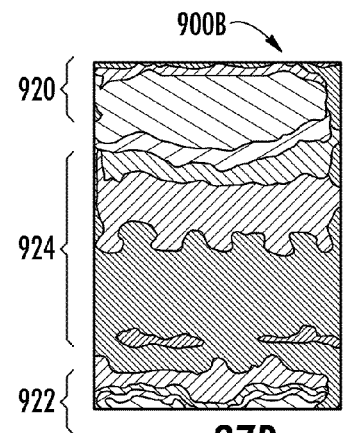
Figure 27C:
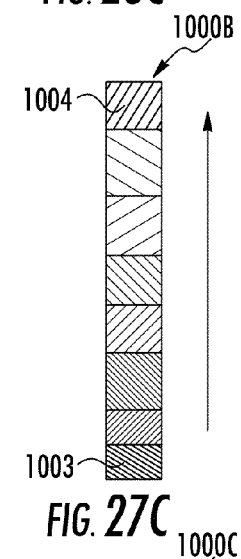

Regarding thermal image 800B, perimeter regions 820, 822 are generally cooler than middle region 824 (FIG. 27A) as evidenced by scale 1000B (FIG. 27C). Hottest region 1004 may be seen in middle region 824, while coolest region 1003 may be seen in perimeter regions 820, 822. Image 900B (FIG. 26B) represents continued heating of the glass article having benefit of the bearing layer of gas, hottest region 1004 being seen in perimeter region 922, with perimeter region 920 being hotter than middle region 924.

Figure 28A:
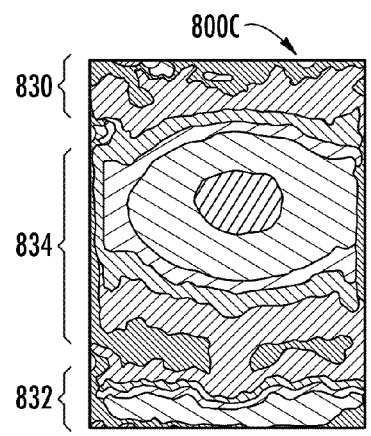
Figure 28B:
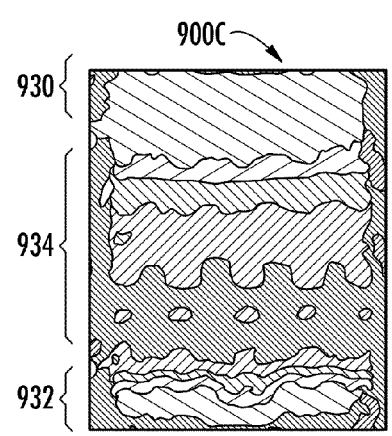
Figure 28C:
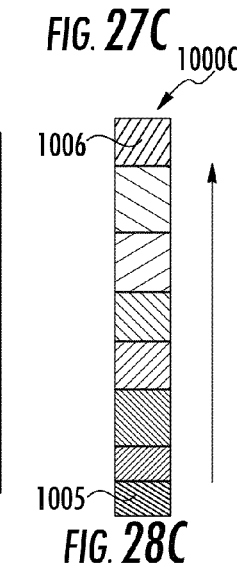

Regarding thermal image 800C, perimeter regions 830, 832 are generally cooler than middle region 834 (FIG. 28A) as evidenced by scale 1000C (FIG. 28C). Hottest region 1006 may be seen in middle region 834, while cooler region 1005 being seen in perimeter regions 830, 832. Image 900C (FIG. 26B) represents heating of the glass article having benefit of the bearing layer of gas, hottest region 1004 being seen in perimeter region 932, with perimeter region 930 being hotter than middle region 934.

It will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents.

What is claimed is:

1. A system for handling a glass article that is being transported to and from a thermal reforming apparatus, comprising:
   at least one robot;
   at least one input nest assembly, the input nest assembly including at least one input cross bar receiving frame, at least one input cross bar for inserting into the at least one input cross bar receiving frame and at least one compound angle nest frame for receiving the at least one input cross bar receiving frame, the at least one input cross bar receiving frame and at least one input cross bar comprising a polymer;
   an output nest assembly, the output nest assembly including at least one output cross bar receiving frame, at least one output cross bar for inserting into the at least one output cross bar receiving frame and another of the at least one compound angle nest frames for receiving the at least one output cross bar receiving frame, the at least one output cross bar receiving frame and at least one output cross bar comprising a heat resistant material;
   a manifold, the manifold having at least one connecting means for connecting the manifold to the robot, at least one adapter plate and at least one chamber;
   at least one wedge adapter plate;
   at least one compound angle adapter plate, the at least one compound angle adapter plate having a compound angle that corresponds to the at least one compound angle nest frame;
   at least one open pneumatic system, the at least one open pneumatic system adapted to apply a fluid pressure that is lower than an ambient pressure through the at least one chamber, creating a partial vacuum in the at least one chamber;

at least one closed pneumatic system, the at least one closed pneumatic system adapted to apply another fluid pressure, the other fluid pressure including a positive fluid pressure greater than the ambient pressure and a negative fluid pressure less than the ambient pressure;

at least one compliance assembly, the compliance assembly including at least one first portion in fluid communication with the at least one closed pneumatic system, and at least one second portion in fluid communication with the at least one open pneumatic system, the at least one first portion comprising a compliance device for accommodating a positional error between a target location and an actual location, at least a portion of the compliance device capable of at least three degrees of freedom, and the at least one second portion comprising a compliance device adapter for interfacing between the compliance device and at least one glass article, at least a portion of the compliance device adapter capable of at least three other degrees of freedom.

2. The system of claim 1, the system cooperating with a thermal reforming apparatus for thermally reforming the glass article from a first shape to a second shape, the thermal reforming apparatus including at least one heating system and at least one mold.

3. The system of claim 2, the at least one mold including a receiving surface and a second-shape profile surface.

4. The system of claim 3, the second-shape profile surface corresponding to the second shape of the at least one glass article, and further including at least one port through the second-shape profile surface, the at least one port being suitable for applying a vacuum to draw the glass against the second-shape profile surface during a thermal reforming process.

5. A method of picking and placing an article, the method comprising the steps of:
positioning an end effector having at least one compliance assembly proximate to at least one article at a first location;
applying at least one fluid pressure to at least one portion of the at least one compliance assembly;
picking the at least one article;
moving the end effector in at least three axes simultaneously toward a second location, the second location having at least one locating reference feature associated with at least one article receiving surface;
placing the at least one article at the second location; and
moving the end effector in a single axis for locating the at least one article to a preheating location proximate to the second location, the preheating location being substantially above the second location.

6. The method of claim 5, further including the step of moving the end effector in a single axis for locating the at least one article at a pre-placement location, whereby the at least one article is offset from the at least one locating reference feature by a first article offset distance in an X-axis and by a second article offset distance in a Y-axis, and offset from the at least one article receiving surface by a third article offset distance in a Z-axis.

7. The method of claim 6, the first article offset distance being equal to the second article offset distance, and the third article offset distance being greater than the first and second article offset distances.

8. The method of claim 6, the step of moving the end effector in at least three axes simultaneously including moving the end effector in the X-axis, the Y-axis and the Z-axis simultaneously, the end effector moving toward the at least one locating reference feature by an amount greater than the first offset distance in the X-axis, an amount greater than the second offset distance in the Y-axis, and an amount less than the third offset distance in the Z-axis.

9. The method of claim 8, the step of moving the end effector in at least three axes simultaneously including moving the end effector in the X-axis and the Y-axis at a first velocity, and moving the end effector in the Z-axis at a second velocity.

10. The method of claim 8, the step of moving the end effector in at least three axes simultaneously including moving the at least one article along the first offset distance and the second offset distance causing the at least one article to make contact with the at least one locating reference feature in the X-axis and the Y-axis.

11. The method of claim 8, the step of moving the end effector in at least three axes simultaneously including moving the at least one article along a portion of the third offset distance leaving the at least one article offset from the at least one receiving surface by a fourth offset distance in the Z-axis that is smaller than the third offset distance.

12. The method of claim 11, the step of placing the at least one article at the second location including releasing the at least one article and allowing the at least one article to freely descend along the fourth offset distance for contacting the at least one receiving surface.

13. The method of claim 5, the first location being at least one input nest and the second location being at least one mold.

14. The method of claim 5, further including the steps of:
repositioning the end effector having the at least one compliance assembly proximate to the at least one article at the second location;
reapplying the at least one fluid pressure to the at least one portion of the at least one compliance assembly;
picking the at least one article from the second location;
moving the end effector toward a third location, the third location including at least one output nest; and
placing the at least one article at the third location.

15. The method of claim 14, the step of reapplying the at least one fluid pressure to the at least one portion of the at least one compliance assembly including reapplying the first positive fluid pressure for locking the at least one compliance assembly.

16. The method of claim 15, the step of repositioning the end effector including moving the end effector toward the at least one article in the Z-axis so the compliance assembly is vertically offset from the at least one article by a fifth offset distance.

17. The method of claim 16, the step of reapplying the at least one fluid pressure to at least one portion of the at least one compliance assembly including reapplying the second negative fluid pressure for picking the at least one article.

18. The method of claim 16, the step of picking the at least one article including the at least one article moving vertically and traversing the fifth offset distance in response to the second negative fluid pressure.

19. The method of claim 5, the at least one article comprising a glass article being at least one member of the group consisting of a glass plate, a glass preform and a 3-dimensionally shaped glass article.

20. The method of claim 5, the step of applying the at least one fluid pressure to the at least one portion of the at least one compliance assembly including applying at least one first fluid pressure to a first portion of the at least one compliance assembly, the first portion having a closed pneumatic system for locking and unlocking the at least one compliance assembly.

21. The method of claim 20, the at least one first fluid pressure including a first positive fluid pressure for locking the at least one compliance assembly and a first negative fluid pressure for unlocking the at least one compliance assembly.

22. A method of picking and placing an article, the method comprising the steps of:
- positioning an end effector having at least one compliance assembly proximate to at least one article at a first location;
- applying at least one fluid pressure to at least one portion of the at least one compliance assembly and applying at least one second fluid pressure to a second portion of the at least one compliance assembly;
- picking the at least one article;
- moving the end effector in at least three axes simultaneously toward a second location, the second location having at least one locating reference feature associated with at least one article receiving surface;
- placing the at least one article at the second location,
- wherein the second portion has an open pneumatic system for picking and placing the at least one article.

23. The method of claim 22, the at least one second fluid pressure being lower than an ambient fluid pressure.

24. The method of claim 23, the open pneumatic system being adapted to apply the at least one second fluid pressure for picking the at least one article, and adapted to withhold the at least one second fluid pressure for placing the at least one article.

* * * * *